(12) United States Patent
Achenbach et al.

(10) Patent No.: US 12,208,739 B2
(45) Date of Patent: Jan. 28, 2025

(54) VEHICULAR CAMERA ASSEMBLY PROCESS WITH ENHANCED ATTACHMENT OF IMAGER ASSEMBLY AT CAMERA HOUSING

(71) Applicant: Magna Electronics Inc., Auburn Hills, MI (US)

(72) Inventors: Garret F. Achenbach, Rochester Hills, MI (US); Martin J. Reckker, Troy, MI (US); Steven G. Gebauer, Oxford, MI (US); Jianguo Wang, Troy, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 182 days.

(21) Appl. No.: 18/153,440

(22) Filed: Jan. 12, 2023

(65) Prior Publication Data
US 2023/0219500 A1 Jul. 13, 2023

Related U.S. Application Data

(60) Provisional application No. 63/266,735, filed on Jan. 13, 2022.

(51) Int. Cl.
*B60R 1/24* (2022.01)
*B60R 11/04* (2006.01)
*H04N 23/51* (2023.01)
*H04N 23/55* (2023.01)

(52) U.S. Cl.
CPC ............... *B60R 1/24* (2022.01); *B60R 11/04* (2013.01); *H04N 23/51* (2023.01); *H04N 23/55* (2023.01)

(58) Field of Classification Search
CPC ... B60R 1/24; B60R 11/04; B60R 2011/0026; H04N 23/51; H04N 23/55; H04N 23/50; H04N 23/54; H04N 23/57
See application file for complete search history.

(56) References Cited

U.S. PATENT DOCUMENTS

| | | | |
|---|---|---|---|
| 4,634,884 A | 1/1987 | Hayashimoto et al. |
| 5,096,287 A | 3/1992 | Kakinami et al. |
| 5,130,804 A | 7/1992 | Tamura |
| 5,204,615 A | 4/1993 | Richards et al. |
| 5,550,677 A | 8/1996 | Schofield et al. |
| 5,587,236 A | 12/1996 | Agrawal et al. |
| 5,670,935 A | 9/1997 | Schofield et al. |
| 5,796,094 A | 8/1998 | Schofield et al. |

(Continued)

*Primary Examiner* — Fernando Alcon
(74) *Attorney, Agent, or Firm* — HONIGMAN LLP (57) ABSTRACT

A vehicular camera module includes a housing for mounting at a vehicular windshield, a processor printed circuit board (processor PCB) disposed in the housing, and an imager assembly. The imager assembly includes (i) a lens barrel accommodating a lens, (ii) an imager printed circuit board (imager PCB), and (iii) a flexible electrical ribbon cable that electrically connects the imager PCB to the processor PCB. An imager is disposed at a first side of the imager PCB. The imager PCB includes an imager portion at which the imager is disposed and attaching portions at respective outboard ends. At least one stress relieving portion is established at the imager PCB between the imager portion and each of the attaching portions. With the lens barrel received through an aperture of the housing, the attaching portions of the imager PCB are attached at the housing via respective fasteners.

21 Claims, 6 Drawing Sheets

(56) References Cited

U.S. PATENT DOCUMENTS

| | | |
|---|---|---|
| 5,877,897 A | 3/1999 | Schofield et al. |
| 5,920,061 A | 7/1999 | Feng |
| 5,949,331 A | 9/1999 | Schofield et al. |
| 6,087,953 A | 7/2000 | DeLine et al. |
| 6,097,023 A | 8/2000 | Schofield et al. |
| 6,124,886 A | 9/2000 | DeLine et al. |
| 6,151,065 A | 11/2000 | Steed et al. |
| 6,172,613 B1 | 1/2001 | DeLine et al. |
| 6,243,003 B1 | 6/2001 | DeLine et al. |
| 6,250,148 B1 | 6/2001 | Lynam |
| 6,259,475 B1 | 7/2001 | Ramachandran et al. |
| 6,278,377 B1 | 8/2001 | DeLine et al. |
| 6,313,454 B1 | 11/2001 | Bos et al. |
| 6,320,176 B1 | 11/2001 | Schofield et al. |
| 6,326,613 B1 | 12/2001 | Heslin et al. |
| 6,329,925 B1 | 12/2001 | Skiver et al. |
| 6,341,523 B2 | 1/2002 | Lynam |
| 6,353,392 B1 | 3/2002 | Schofield et al. |
| 6,396,397 B1 | 5/2002 | Bos et al. |
| 6,420,975 B1 | 7/2002 | DeLine et al. |
| 6,428,172 B1 | 8/2002 | Hutzel et al. |
| 6,445,287 B1 | 9/2002 | Schofield et al. |
| 6,466,136 B2 | 10/2002 | DeLine et al. |
| 6,498,620 B2 | 12/2002 | Schofield et al. |
| 6,501,387 B2 | 12/2002 | Skiver et al. |
| 6,559,435 B2 | 5/2003 | Schofield et al. |
| 6,593,565 B2 | 7/2003 | Heslin et al. |
| 6,690,268 B2 | 2/2004 | Schofield et al. |
| 6,768,422 B2 | 7/2004 | Schofield et al. |
| 6,774,356 B2 | 8/2004 | Heslin et al. |
| 6,795,237 B1 | 9/2004 | Marinelli et al. |
| 6,806,452 B2 | 10/2004 | Bos et al. |
| 6,822,563 B2 | 11/2004 | Bos et al. |
| 6,824,281 B2 | 11/2004 | Schofield et al. |
| 6,831,261 B2 | 12/2004 | Schofield et al. |
| 6,953,253 B2 | 10/2005 | Schofield et al. |
| 6,968,736 B2 | 11/2005 | Lynam |
| 7,004,593 B2 | 2/2006 | Weller et al. |
| 7,038,577 B2 | 5/2006 | Pawlicki et al. |
| 7,095,572 B2 | 8/2006 | Lee et al. |
| 7,188,963 B2 | 3/2007 | Schofield et al. |
| 7,205,904 B2 | 4/2007 | Schofield |
| 7,215,479 B1 | 5/2007 | Bakin |
| 7,262,406 B2 | 8/2007 | Heslin et al. |
| 7,265,342 B2 | 9/2007 | Heslin et al. |
| 7,289,037 B2 | 10/2007 | Uken et al. |
| 7,311,406 B2 | 12/2007 | Schofield et al. |
| 7,325,934 B2 | 2/2008 | Schofield et al. |
| 7,339,149 B1 | 3/2008 | Schofield et al. |
| 7,344,261 B2 | 3/2008 | Schofield et al. |
| 7,355,524 B2 | 4/2008 | Schofield |
| 7,388,182 B2 | 6/2008 | Schofield et al. |
| 7,402,786 B2 | 7/2008 | Schofield et al. |
| 7,420,159 B2 | 9/2008 | Heslin et al. |
| 7,423,248 B2 | 9/2008 | Schofield et al. |
| 7,425,076 B2 | 9/2008 | Schofield et al. |
| 7,480,149 B2 | 1/2009 | DeWard et al. |
| 7,526,103 B2 | 4/2009 | Schofield et al. |
| 7,533,998 B2 | 5/2009 | Schofield et al. |
| 7,536,316 B2 | 5/2009 | Ozer et al. |
| 7,538,316 B2 | 5/2009 | Heslin et al. |
| 7,551,103 B2 | 6/2009 | Schofield |
| 7,579,939 B2 | 8/2009 | Schofield et al. |
| 7,616,781 B2 | 11/2009 | Schofield et al. |
| 7,655,894 B2 | 2/2010 | Schofield et al. |
| 7,679,498 B2 | 3/2010 | Pawlicki et al. |
| 7,697,027 B2 | 4/2010 | McMahon et al. |
| 7,720,580 B2 | 5/2010 | Higgins-Luthman |
| 7,728,721 B2 | 6/2010 | Schofield et al. |
| 7,855,755 B2 | 12/2010 | Weller et al. |
| 7,877,175 B2 | 1/2011 | Higgins-Luthman |
| 7,888,629 B2 | 2/2011 | Heslin et al. |
| 7,916,009 B2 | 3/2011 | Schofield et al. |
| 7,918,570 B2 | 4/2011 | Weller et al. |
| 7,946,505 B2 | 5/2011 | Lynam et al. |
| 7,965,336 B2 | 6/2011 | Bingle et al. |
| 7,972,045 B2 | 7/2011 | Schofield |
| 7,994,462 B2 | 8/2011 | Schofield et al. |
| 8,063,759 B2 | 11/2011 | Bos et al. |
| 8,070,332 B2 | 12/2011 | Higgins-Luthman et al. |
| 8,090,153 B2 | 1/2012 | Schofield et al. |
| 8,142,059 B2 | 3/2012 | Higgins-Luthman et al. |
| 8,162,518 B2 | 4/2012 | Schofield |
| 8,179,437 B2 | 5/2012 | Schofield et al. |
| 8,194,133 B2 | 6/2012 | DeWind et al. |
| 8,203,440 B2 | 6/2012 | Schofield et al. |
| 8,222,588 B2 | 7/2012 | Schofield et al. |
| 8,223,203 B2 | 7/2012 | Ohsumi et al. |
| 8,239,086 B2 | 8/2012 | Higgins-Luthman |
| 8,254,011 B2 | 8/2012 | Baur et al. |
| 8,256,821 B2 | 9/2012 | Lawlor et al. |
| 8,289,142 B2 | 10/2012 | Pawlicki et al. |
| 8,294,608 B1 | 10/2012 | Lynam |
| 8,314,689 B2 | 11/2012 | Schofield et al. |
| 8,324,552 B2 | 12/2012 | Schofield et al. |
| 8,325,986 B2 | 12/2012 | Schofield et al. |
| 8,339,453 B2 | 12/2012 | Blake, III et al. |
| 8,355,839 B2 | 1/2013 | Schofield et al. |
| 8,376,595 B2 | 2/2013 | Higgins-Luthman |
| 8,386,114 B2 | 2/2013 | Higgins-Luthman |
| 8,405,725 B2 | 3/2013 | McMahon et al. |
| 8,405,726 B2 | 3/2013 | Schofield et al. |
| 8,451,332 B2 | 5/2013 | Rawlings |
| 8,513,590 B2 | 8/2013 | Heslin et al. |
| 8,529,075 B2 | 9/2013 | Yamada et al. |
| 8,531,278 B2 | 9/2013 | DeWard et al. |
| 8,534,887 B2 | 9/2013 | DeLine et al. |
| 8,542,451 B2 | 9/2013 | Lu et al. |
| 8,629,768 B2 | 1/2014 | Bos et al. |
| 8,665,079 B2 | 3/2014 | Pawlicki et al. |
| 8,743,203 B2 | 6/2014 | Karner et al. |
| 8,851,690 B2 | 10/2014 | Uken et al. |
| 8,944,655 B2 | 2/2015 | Verrat-Debailleul et al. |
| 9,150,165 B1 | 10/2015 | Fortin et al. |
| 9,156,403 B2 | 10/2015 | Rawlings et al. |
| 9,160,908 B2 | 10/2015 | Mori et al. |
| 9,233,641 B2 | 1/2016 | Sesti et al. |
| 9,277,104 B2 | 3/2016 | Sesti et al. |
| 9,451,138 B2 | 9/2016 | Winden et al. |
| 9,487,159 B2 | 11/2016 | Achenbach |
| 9,596,387 B2 | 3/2017 | Achenbach et al. |
| 9,871,971 B2 | 1/2018 | Wang et al. |
| 9,896,039 B2 | 2/2018 | Achenbach et al. |
| 10,214,157 B2 | 2/2019 | Achenbach et al. |
| 10,264,219 B2 | 4/2019 | Mleczko et al. |
| 10,272,857 B2 | 4/2019 | Conger et al. |
| 10,576,908 B2 | 3/2020 | Achenbach et al. |
| 10,946,813 B2 | 3/2021 | Achenbach et al. |
| 11,390,223 B2 | 7/2022 | Achenbach et al. |
| 11,697,382 B2 | 7/2023 | Achenbach et al. |
| 11,964,617 B2 | 4/2024 | Achenbach et al. |
| 2003/0169522 A1 | 9/2003 | Schofield et al. |
| 2005/0141106 A1 | 6/2005 | Lee et al. |
| 2006/0050018 A1 | 3/2006 | Hutzel et al. |
| 2006/0077575 A1 | 4/2006 | Nakai et al. |
| 2006/0103727 A1 | 5/2006 | Tseng |
| 2007/0221826 A1 | 9/2007 | Bechtel et al. |
| 2008/0252882 A1 | 10/2008 | Kesterson |
| 2009/0244361 A1 | 10/2009 | Gebauer et al. |
| 2009/0295181 A1 | 12/2009 | Lawlor et al. |
| 2010/0110192 A1 | 5/2010 | Johnston et al. |
| 2010/0134616 A1 | 6/2010 | Seger et al. |
| 2010/0165468 A1 | 7/2010 | Yamada et al. |
| 2010/0279438 A1 | 11/2010 | An et al. |
| 2011/0025850 A1 | 2/2011 | Maekawa et al. |
| 2011/0298925 A1 | 12/2011 | Inoue et al. |
| 2012/0008129 A1 | 1/2012 | Lu et al. |
| 2012/0013741 A1 | 1/2012 | Blake, III et al. |
| 2012/0081550 A1 | 4/2012 | Sewell |
| 2012/0265416 A1 | 10/2012 | Lu et al. |
| 2013/0002873 A1 | 1/2013 | Hess |
| 2013/0076905 A1 | 3/2013 | Blake, III et al. |
| 2013/0242099 A1 | 9/2013 | Sauer et al. |
| 2013/0293771 A1 | 11/2013 | Mori et al. |

(56) References Cited

U.S. PATENT DOCUMENTS

| | | | |
|---|---|---|---|
| 2014/0015977 A1 | 1/2014 | Taylor et al. | |
| 2014/0043465 A1 | 2/2014 | Salomonsson et al. | |
| 2014/0055671 A1 | 2/2014 | Kawamura | |
| 2014/0160284 A1 | 6/2014 | Achenbach et al. | |
| 2014/0168507 A1 | 6/2014 | Renaud | |
| 2014/0226012 A1 | 8/2014 | Achenbach | |
| 2014/0298642 A1 | 10/2014 | Sesti et al. | |
| 2014/0321064 A1 | 10/2014 | Bose et al. | |
| 2014/0354878 A1 | 12/2014 | Winter et al. | |
| 2014/0373345 A1 | 12/2014 | Steigerwald | |
| 2015/0015713 A1 | 1/2015 | Wang et al. | |
| 2015/0029337 A1 | 1/2015 | Uchiyama et al. | |
| 2015/0124098 A1 | 5/2015 | Winden et al. | |
| 2015/0146094 A1 | 5/2015 | Seger et al. | |
| 2015/0222795 A1 | 8/2015 | Sauer et al. | |
| 2015/0251605 A1 | 9/2015 | Uken et al. | |
| 2015/0266430 A1 | 9/2015 | Mleczko et al. | |
| 2015/0327398 A1 | 11/2015 | Achenbach et al. | |
| 2015/0365569 A1 | 12/2015 | Mai et al. | |
| 2016/0037028 A1 | 2/2016 | Biemer | |
| 2016/0268716 A1 | 9/2016 | Conger et al. | |
| 2017/0054881 A1* | 2/2017 | Conger | H04N 23/57 |
| 2017/0129419 A1* | 5/2017 | Conger | H04N 23/51 |
| 2017/0133811 A1 | 5/2017 | Conger et al. | |
| 2017/0295306 A1 | 10/2017 | Mleczko | |
| 2017/0302829 A1 | 10/2017 | Mleczko et al. | |
| 2018/0072239 A1 | 3/2018 | Wienecke et al. | |
| 2019/0007591 A1* | 1/2019 | Wang | H04N 7/183 |
| 2019/0118730 A1* | 4/2019 | Devota | B60R 11/04 |
| 2020/0010024 A1 | 1/2020 | Sesti et al. | |
| 2020/0039447 A1* | 2/2020 | Winden | H04N 23/55 |
| 2020/0172021 A1* | 6/2020 | Devota | B60R 11/04 |
| 2021/0041768 A1* | 2/2021 | Sesti | G03B 17/12 |
| 2021/0136356 A1* | 5/2021 | Rinaldo | H01R 12/714 |
| 2021/0382375 A1* | 12/2021 | Sesti | H04N 23/57 |
| 2021/0392249 A1* | 12/2021 | Winden | H04N 23/51 |
| 2022/0009425 A1* | 1/2022 | Tokito | B60R 11/04 |
| 2022/0291572 A1* | 9/2022 | Oba | H04N 23/52 |
| 2022/0355745 A1* | 11/2022 | Achenbach | H05K 7/2039 |
| 2022/0360691 A1 | 11/2022 | Dreiocker et al. | |
| 2022/0373762 A1 | 11/2022 | Skrocki | |
| 2023/0234518 A1* | 7/2023 | Furutake | H04N 23/51 |
| | | | 348/148 |
| 2023/0284386 A1* | 9/2023 | McNally | B60R 16/0239 |
| | | | 174/261 |
| 2023/0328890 A1* | 10/2023 | Angier | H05K 1/144 |
| | | | 348/148 |
| 2023/0336853 A1* | 10/2023 | Li | H04N 23/54 |
| 2023/0398951 A1* | 12/2023 | Bair | B60S 1/026 |
| 2023/0421907 A1* | 12/2023 | Wang | H04N 7/183 |
| 2024/0053174 A1* | 2/2024 | Mcguire | B60R 11/04 |
| 2024/0236452 A1* | 7/2024 | Oh | G03B 30/00 |
| 2024/0243647 A1* | 7/2024 | Lee | H04N 23/51 |
| 2024/0244306 A1* | 7/2024 | Park | H04N 23/57 |
| 2024/0244325 A1* | 7/2024 | Park | H04N 23/57 |
| 2024/0280880 A1* | 8/2024 | Deng | G03B 30/00 |

\* cited by examiner

VEHICULAR CAMERA ASSEMBLY PROCESS WITH ENHANCED ATTACHMENT OF IMAGER ASSEMBLY AT CAMERA HOUSING

CROSS REFERENCE TO RELATED APPLICATION

The present application claims the filing benefits of U.S. provisional application Ser. No. 63/266,735, filed Jan. 13, 2022, which is hereby incorporated herein by reference in its entirety.

FIELD OF THE INVENTION

The present invention relates generally to a vehicular vision system and, more particularly, to a vehicular vision system that utilizes one or more cameras at a vehicle.

BACKGROUND OF THE INVENTION

Use of imaging sensors in vehicle imaging systems is common and known. Examples of such known systems are described in U.S. Pat. Nos. 7,965,336; 5,949,331; 5,670,935 and/or 5,550,677, which are hereby incorporated herein by reference in their entireties.

SUMMARY OF THE INVENTION

A vehicular driver assistance system or vision system or imaging system for a vehicle utilizes one or more cameras to capture image data representative of images exterior of the vehicle. The camera or camera module includes a housing an imager assembly, which comprises a lens barrel and an imager printed circuit board (imager PCB), with the imager PCB fixed to the lens holder. The imager PCB is attached at a housing of the camera module.

For example, a vehicular camera module comprises a camera housing for mounting at an in-cabin side of a windshield of a vehicle equipped with the vehicular camera module. The module, with the camera housing mounted at the in-cabin side of the windshield of the vehicle, views forward of the vehicle through the windshield. A processor printed circuit board is disposed in the camera housing. An imager assembly comprises (i) a lens barrel accommodating a lens, (ii) an imager printed circuit board, and (iii) a flexible electrical ribbon cable. The imager printed circuit board is electrically connected to the processor printed circuit board via the flexible electrical ribbon cable. The camera housing has an upper housing portion and a lower housing portion. With the camera housing mounted at the in-cabin side of the windshield, the upper housing portion is above the lower housing portion and attached thereto. The upper housing portion has an aperture that receives the lens barrel. The imager printed circuit board comprises a first side and a second side opposite the first side and separated from the first side by a thickness of the imager printed circuit board. The imager printed circuit board comprises an imager portion and attaching portions at respective outboard ends of the imager printed circuit board (e.g., at opposite lateral ends when the camera module is installed at a vehicle). An imager is disposed at the first side of the imager portion of the imager printed circuit board. At least one stress relieving portion is established at the imager printed circuit board between the imager portion and each of the attaching portions. With the lens barrel received through the aperture of the upper housing portion of the camera housing, the attaching portions of the imager printed circuit board are attached at the upper housing portion of the camera housing via respective fasteners. Optionally, the at least one stress reliving portion includes at least one stress relieving slot established at least partially through the imager printed circuit board between the imager portion and the attaching portions.

Optionally, a vehicular camera module comprises a camera housing for mounting at an in-cabin side of a windshield of a vehicle equipped with the vehicular camera module. With the camera housing mounted at the in-cabin side of the windshield, the camera module views forward of the vehicle through the windshield. A processor printed circuit board is disposed in the camera housing. An imager assembly includes (i) a lens barrel accommodating a lens, (ii) an imager printed circuit board, (iii) an attaching flange attached at the lens barrel, and (iv) a flexible electrical ribbon cable. The imager printed circuit board is electrically connected to the processor printed circuit board via the flexible electrical ribbon cable. The camera housing has an upper housing portion and a lower housing portion. With the camera housing mounted at the in-cabin side of the windshield, the upper housing portion is above the lower housing portion and attached thereto. The upper housing portion has an aperture that receives the lens barrel. The imager printed circuit board comprises a first side and a second side opposite the first side and separated from the first side by a thickness of the imager printed circuit board, with an imager disposed at the first side of the imager printed circuit board. A board end of the lens barrel is attached at the first side of the imager printed circuit board and the attaching flange is disposed along the lens barrel and spaced from the board end of the lens barrel and spaced from the imager printed circuit board. With the lens barrel received through the aperture of the upper housing portion of the camera housing, the attaching flange is attached at an inner side of the upper housing portion of the camera housing via at least one fastener.

Optionally, a spacing ring is attached at the first side of the imager printed circuit board and at least partially circumscribing the imager at the first side of the imager printed circuit board. The spacing ring is disposed between the first side of the imager printed circuit board and the board end of the lens barrel and may at least partially circumscribe the board end of the lens barrel. Optionally, an anti-warping ring may be attached at the second side of the imager printed circuit board and circumscribes a region of the second side of the imager printed circuit board that is opposite from the imager disposed at the first side of the imager printed circuit board.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to detect objects at or near the vehicle and in the predicted path of the vehicle. For example, a forward viewing camera disposed at and behind the windshield of the vehicle may capture image data of the scene forward of the vehicle for one or more driving assist systems of the vehicle. Optionally, one or more other cameras may be disposed at the vehicle with exterior fields of view, whereby the image data captured by those cameras may be processed for object detection and/or used to generate video images for viewing by the driver of the vehicle, such as to assist a driver of the vehicle in maneuvering the vehicle in a rearward direction. The vision system includes an image processor or image processing system that is operable to receive image data from one or more cameras and provide an output to a vehicle system and/or to a display device for displaying images representative of the captured image data. Optionally, the vision system may provide display, such as a rearview display or a top down or bird's eye or surround view display or the like.

Figure 1:
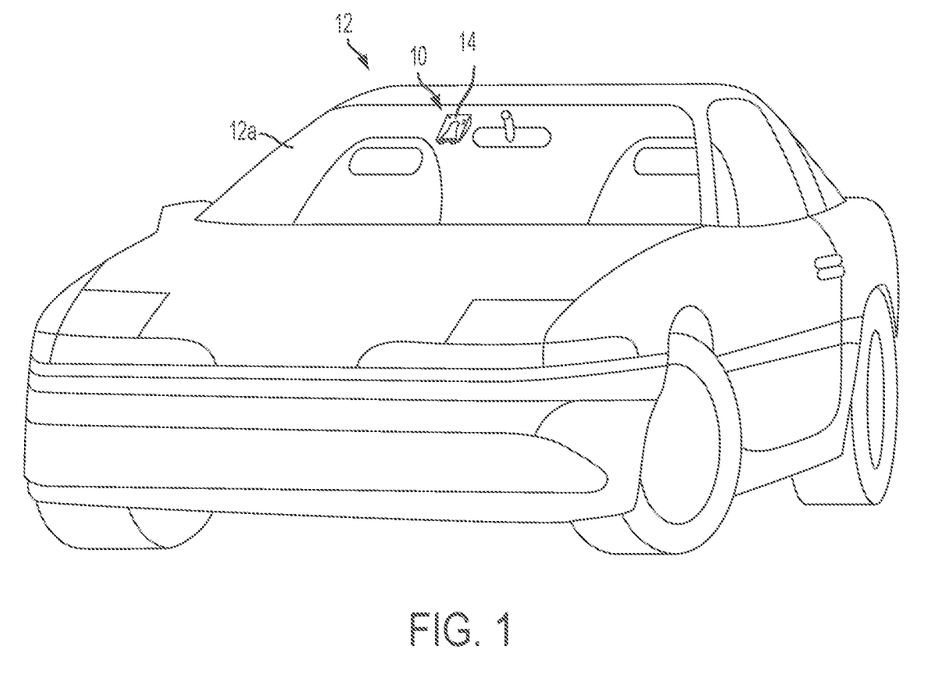
FIG. 1 is a perspective view of a vehicle with a vision system that incorporates a camera module at an in-cabin side of a windshield of the vehicle.
Figures 2, 3A, 3B, 3C:
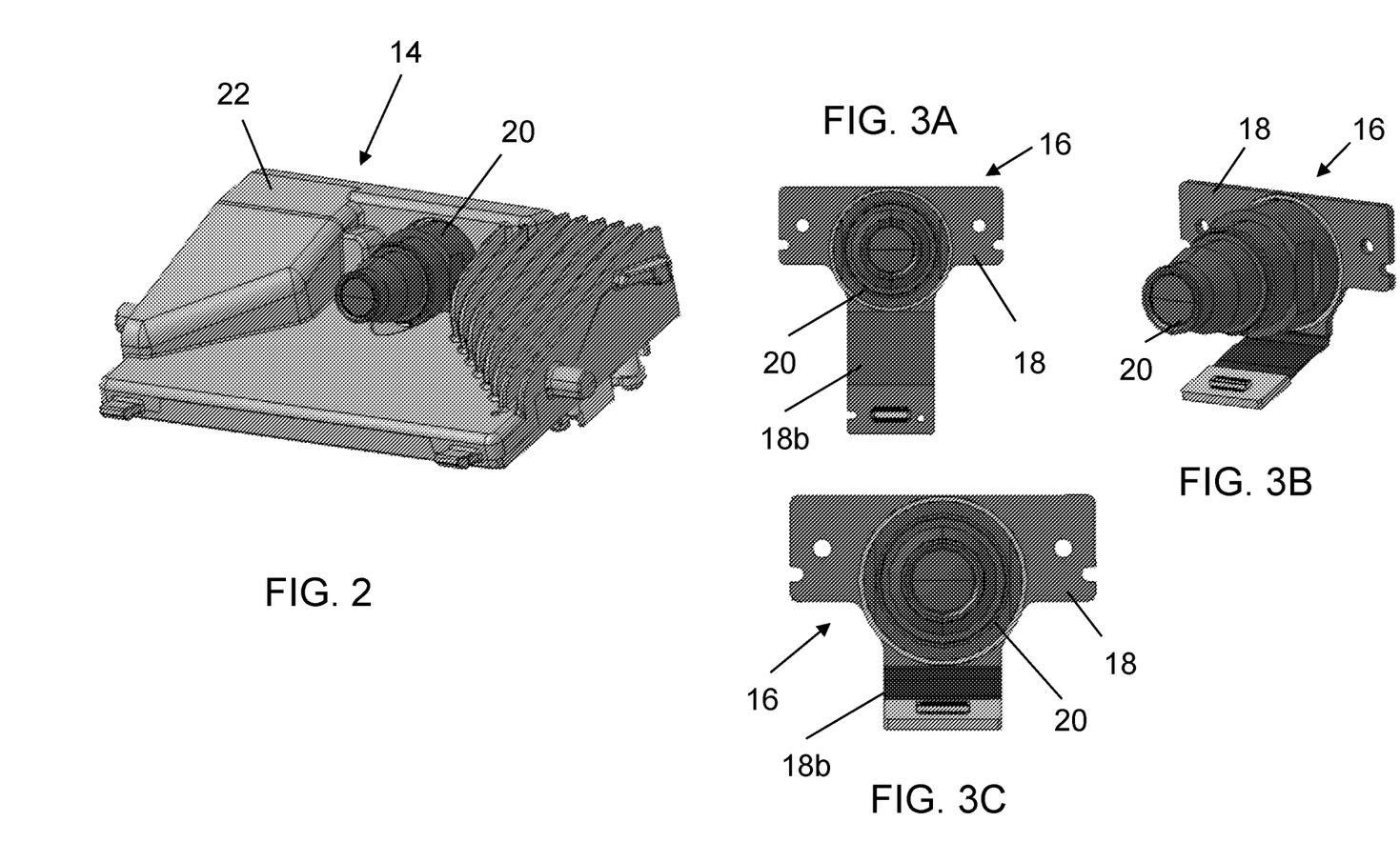
FIG. 2 is a perspective view of a camera module.
FIGS. 3A-C are views of an imager assembly of the camera module of FIG. 2.
Figure 4:
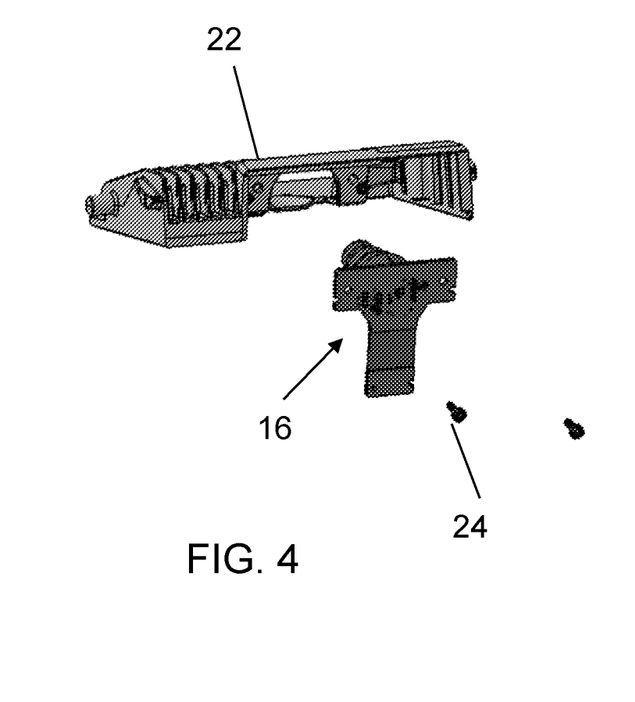
FIGS. 4 and 5 are views of part of the camera module, showing how the imager assembly is attached at a camera housing portion.
Figure 5:
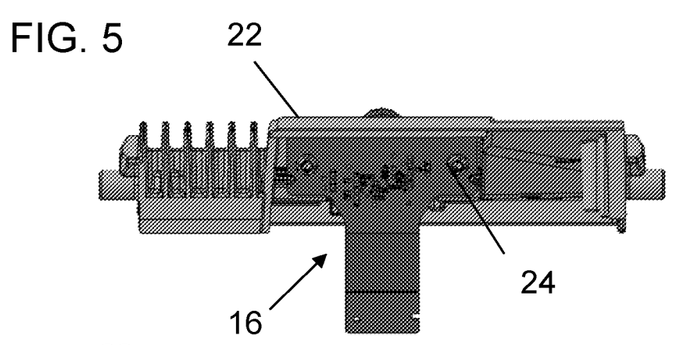

Referring now to the drawings and the illustrative embodiments depicted therein, a vision system 10 for a vehicle 12 includes at least one exterior viewing imaging sensor or camera, such as a forward viewing imaging sensor or camera 14, which may be disposed at and behind the windshield 12a of the vehicle 12 and viewing forward through the windshield 12a so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. The forward viewing camera disposed at the windshield of the vehicle views through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) having electronic circuitry and associated software, with the electronic circuitry including a data processor or image processor that is operable to process image data captured by the camera or cameras, whereby the ECU may detect or determine presence of objects or the like and/or the system provide displayed images at a display device for viewing by the driver of the vehicle. The data transfer or signal communication from the camera to the ECU may comprise any suitable data or communication link, such as a vehicle network bus or the like of the equipped vehicle.

As shown in FIGS. 2-6, the camera module 14 includes an imager assembly 16 that comprises an imager printed circuit board (PCB) 18 having an imager 18a (FIG. 6) disposed thereat and a flexible electrical connector 18b (e.g., a flexible ribbon cable or the like) extending therefrom for electrical connection to a processing printed circuit board (processing PCB) of the camera module 14. The imager assembly 16 also includes a lens barrel 20 that accommodates a lens or lens assembly (comprising a plurality of lens optics or elements). The imager assembly 16 is configured to be attached or fastened to a camera housing portion 22, such as via a plurality of fasteners 24. As shown in FIGS. 2-6, the lens barrel is received through an aperture of an upper portion of the camera housing when the imager assembly is attached at the upper portion of the camera housing. The imager assembly is disposed at least partially above the processing PCB and the flexible cable may extend through an aperture or cutout of the processing PCB to connect to a connector at the lower side of the processing PCB to electrically connect circuitry of the imager PCB to circuitry of the processing PCB. The upper portion of the camera housing may include a stray light shield in front of and below the lens barrel and may include heat dissipating fins, such as by utilizing aspects of the camera modules described in U.S. Pat. Nos. 9,896,039; 9,871,971 and/or 9,596,387, which are hereby incorporated herein by reference in their entireties.

Typically, active focus and alignment is used to set and secure a focal position of a lens to an imager component. However, this leads to expensive and complicated measures to manage the compliance tolerances created by camera components and manufacturing focus/alignment processes. For example, a camera may be assembled using an active PCB alignment, which may use screws to secure the PCB to the lens holder or front camera housing. After the PCB is secured to the lens holder, the lens barrel (such as a threaded lens barrel) is threaded into the lens holder and used to set the focus of the lens relative to the imager. After the lens and imager are optically aligned and focused (via threading the lens barrel into the lens holder), the lens barrel (and lens) is secured to the lens holder with adhesive on the lens threads.

Optionally, active lens alignment may be provided where the imager PCB is secured to the housing using screws and the lens is actively moved to set focus and alignment, whereby a quick cure adhesive is used to set the focus and alignment of the lens relative to the imager. The adhesive acts as a compliant material (before it is cured) to allow for focus and alignment, which is achieved by moving the lens relative to the lens holder. Optionally, the adhesive may be at least partially cured via ultraviolet (UV) light and may further be cured via additional curing. The UV and additional curing increases the tolerance stack of the finished assembly. Quick cure adhesives require UV curing and additional curing. This curing increases the tolerance stack of the finished assembly.

Optionally, active PCB focus and alignment may be achieved via a one piece lens assembly that is secured to the housing or lens holder utilizing adhesive initially, and then the imager PCB is actively moved relative to the housing or lens holder to set focus, alignment, and rotation, where a quick cure adhesive is used to set the focus, alignment, and rotation. The adhesive (that bonds the circuit board to the lens holder) acts as a compliant material (before it is cured) to allow for focus and alignment, which is achieved by moving the PCB relative to the lens holder. The UV and additional curing increases the tolerance stack of the finished assembly, and quick cure adhesives require UV and additional curing. This curing increases the tolerance stack of the finished assembly.

Figure 6:
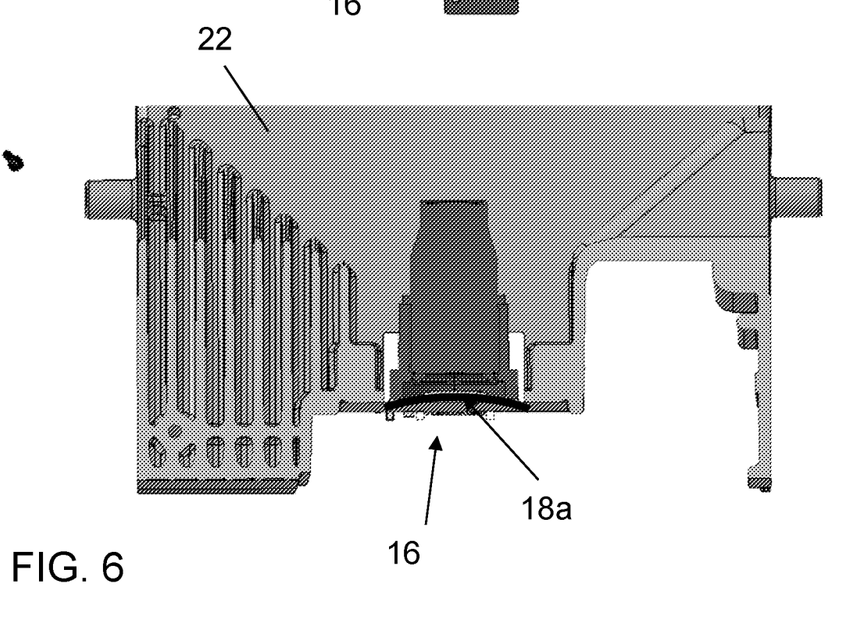
FIG. 6 is a view of the assembled imager assembly and camera housing portion, showing how the printed circuit board may flex.

The imager assembly 16 comprises the lens assembly (comprising an imager printed circuit board and a lens barrel that accommodates a lens) that is assembled and provided with the lens aligned with the imager 18*a*. During attachment of the imager assembly 16 to the camera housing portion 22, the imager PCB 18 may flex and thus change the image plane position and focus of the camera module 14. As shown in FIG. 6, attaching the imager PCB 18 to the housing 22 flexes the imager PCB 18 and causes the focus plane to change position (changes focus). This may be due to the two mounting surfaces on the housing being uneven and the imager PCB warping during the lens mounting or imager reflow.

The imager assembly is used in the automotive camera industry for its low cost manufacturing and small packaging. A challenge for imager assemblies is to maintain peak focus while installing it into the protective cover or housing portion of the camera module. Because of the protective cover's uneven mating surface (the material may comprise die-cast aluminum, zinc, and plastic), the imager on the imager printed circuit board (imager PCB) moves relative to the lens focus plane, which changes the focus of the camera. This deflection of the imager PCB causes large camera focus variation during the life cycle of the camera on the vehicle.

As shown in FIGS. 7-11, an imager assembly 116 comprises an imager printed circuit board (PCB) 118 having an imager 118*a* disposed thereat and a flexible electrical connector 118*b* (e.g., a flexible ribbon cable or the like) extending therefrom for electrical connection to a processing printed circuit board of the camera module. The imager assembly includes a lens barrel 120 that accommodates a lens or lens assembly (comprising a plurality of lens optics or elements). The lens barrel 120 is received within a winged attaching flange 126 and is fixed relative to the attaching flange 126, such as via an adhesive or press-fit or the like. The lens barrel 120 has an outer end 120*a*, which is received in a passageway of the winged attaching flange 126, while an inner end 120*b* of the lens barrel 120 is attached at the imager PCB 118, such as via adhesive or fasteners. The inner end 120*b* of the lens barrel 120 (and optionally, the adhesive or adhesive ring attaching the lens barrel to the PCB) may circumscribe, or partially circumscribe, the imager 118*a* at the imager PCB 118 when the imager PCB is attached at the inner end of the lens barrel. Optionally, a spacer ring may be attached at the PCB 118 and at least partially circumscribe the imager 118*a*, with the inner end 120*b* of the lens barrel 120 attached at a side of the spacer ring opposite the side of the spacer ring that is attached at the PCB 118, so that the spacer ring spaces the PCB and lens barrel apart from one another. Optionally, a spacer ring attached at the imager PCB may at least partially circumscribe the imager and may at least partially circumscribe the inner end of the lens barrel when the imager PCB is attached at the inner end of the lens barrel.

Figures 7, 8, 9:
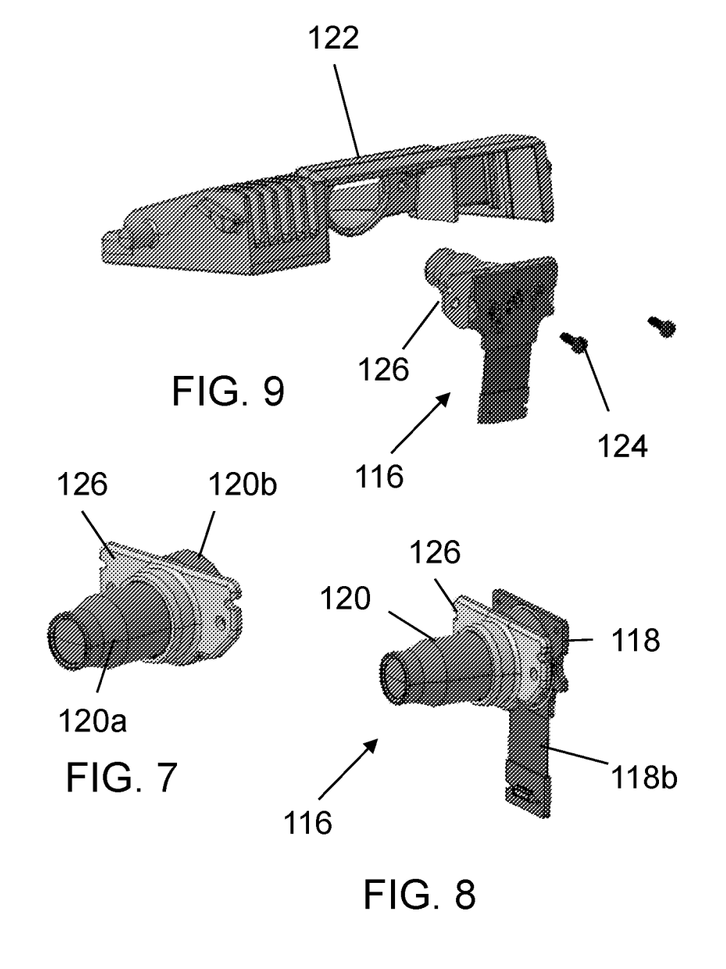
FIGS. 7 and 8 are perspective views of a lens assembly having an attaching flange for attaching the imager assembly to a camera housing portion.
FIGS. 9-11 are views of part of a camera module, showing how the imager assembly is attached at the camera housing portion using the attaching flange.
Figure 10:
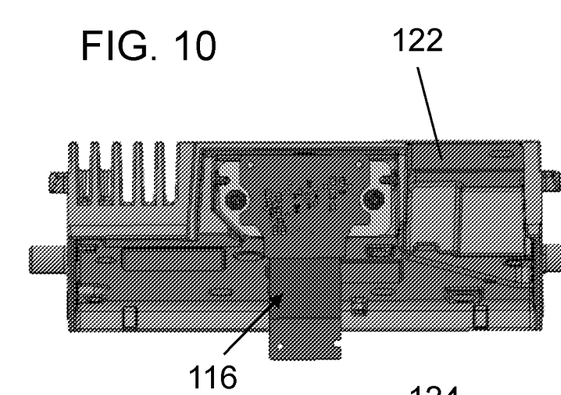
Figure 11:
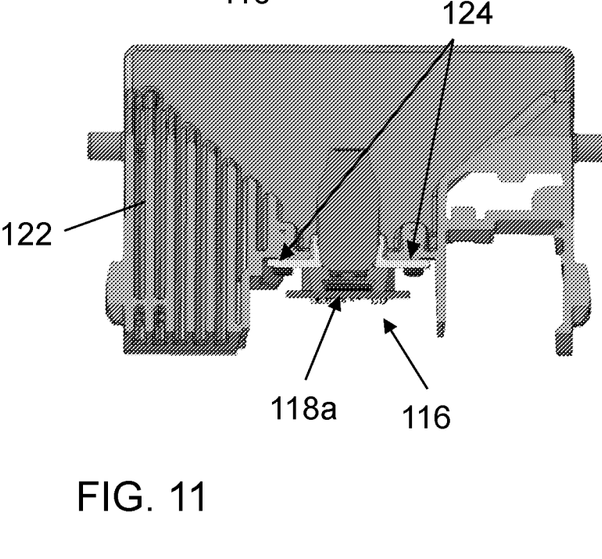

The attaching flange 126 is spaced from the imager PCB 118 along the lens barrel 120 and is configured to be attached or fastened to the camera housing portion 122, such as via a plurality of fasteners 124. By attaching the attaching flange 126 (which is spaced from the imager PCB) to the camera housing 122, stresses and flexing at the PCB 118 are reduced. The lens may be aligned with the imager 118*a* via any suitable means, and is aligned prior to attaching the attaching flange 126 at the camera housing portion 122. Optionally, the focus process and camera or imager assembly may comprise aspects of the processes and assemblies described in U.S. Publication No. US-2022-0360691; US-2022-0373762; and/or US-2021-0382375, which are all hereby incorporated herein by reference in their entireties.

As shown in FIGS. 10 and 11, with the attaching flange 126 disposed along the lens barrel 120 and the lens barrel 120 attached to the imager PCB 118, portions or wings of the attaching flange 126 extend laterally from the lens barrel 120 and outboard of lateral edges of the imager PCB 118. Thus, the fasteners 124 (e.g., screws or other threaded fasteners) may be fastened to the camera housing 122 through apertures formed in the respective lateral wings of the attaching flange 126 on opposite sides of the imager PCB 118. Respective cutouts or recesses may be formed in the lateral edges of the imager PCB at positions corresponding to the apertures to provide access to the fasteners 124 during installation.

Figures 12, 13, 14, 15:
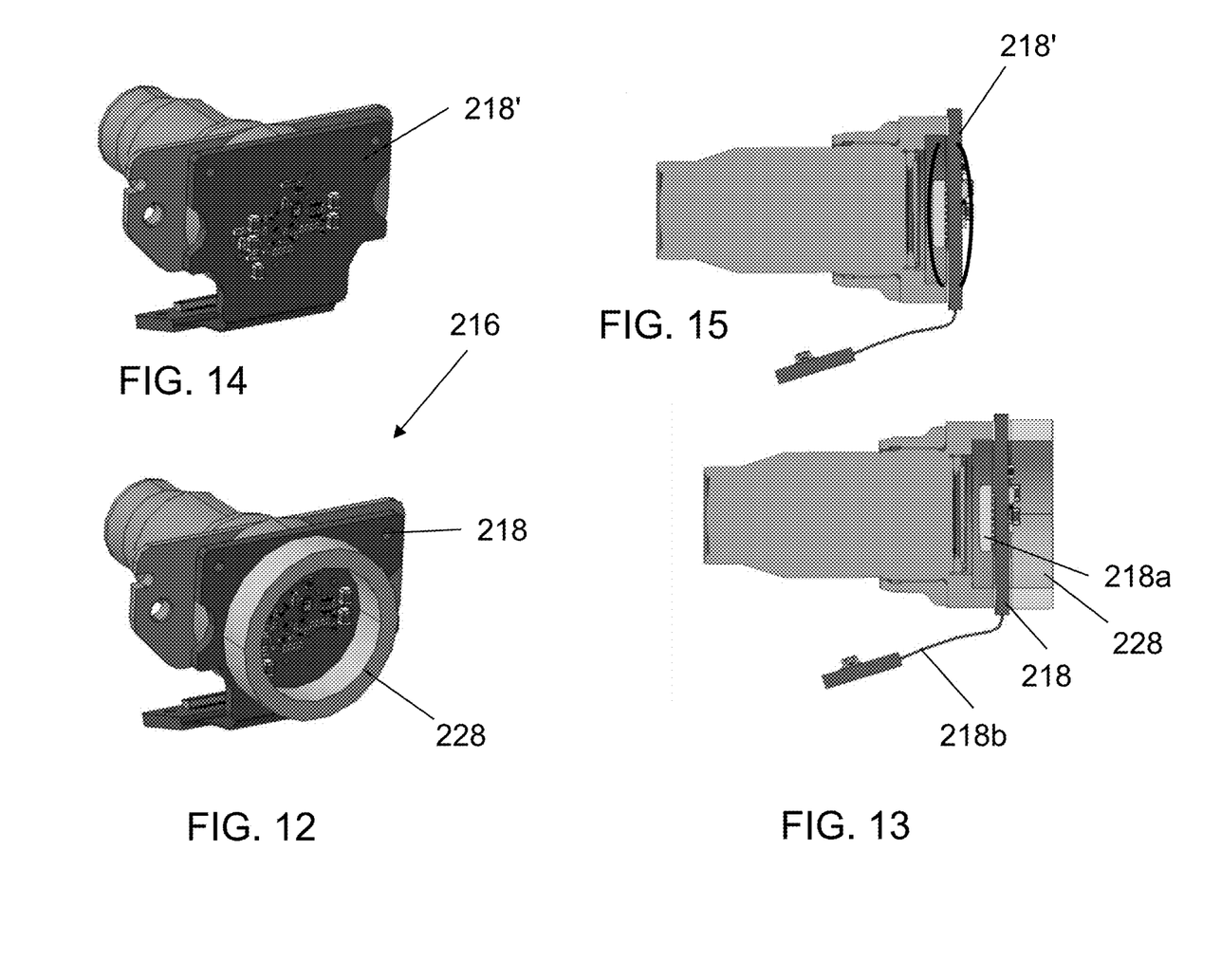
FIGS. 12 and 13 are views of an imager assembly having a counter warping ring attached at the rear side of the printed circuit board opposite the side that faces the lens assembly.
FIGS. 14 and 15 are views of an imager assembly similar to the imager assembly of FIGS. 12 and 13, but without the counter warping ring.

Optionally, and such as shown in FIGS. 12 and 13, the imager assembly 216 may include a counter warping ring 228 attached at the second or rear side of the imager PCB 218 and circumscribing the imager region of the PCB (where the imager 218*a* is disposed at the other, first or front side of the imager PCB). The ring 228 is adhesively attached at the opposite side of the PCB 218 from the attached lens barrel 220 and imager 218*a* to counter the warping effects (focus change) due to heating and cooling of the camera module during use on the vehicle. As shown in FIGS. 14 and 15, without the ring at the rear of the PCB, the PCB 218' may warp closer to or further from the lens (focus changes) when exposed to higher and lower temperatures. This happens because the PCB is restrained on one side when the lens is adhered to it. As shown in FIG. 13, by attaching the ring to the opposite side of PCB from the lens, the ring (comprising a rigid element, such as metal or plastic) reduces or limits or eliminates the warping (focus change) caused by restraining only one side of the imager PCB side.

Optionally, and such as shown in FIGS. 16-20, an imager assembly 316 comprises an imager printed circuit board (PCB) 318 having an imager 318*a* disposed thereat and a flexible electrical connector 318*b* (e.g., a flexible ribbon cable or the like) extending therefrom for electrical connection to a processing printed circuit board of the camera module. The imager assembly 316 includes a lens barrel 320 that accommodates a lens or lens assembly (comprising a plurality of lens optics or elements). The imager PCB 318 includes attaching portions 318*c* that are separated from the imager region of the PCB by stress relieving portions 318*d*. The stress relieving portions 318*d* absorb or dissipate stresses experienced at the attaching portions 318*c* from extending to the imager region of the PCB 318. For example, the stress relieving portions 318*d* may comprise portions of the PCB 318 that are more flexible than the attaching portions 318*c* and the imager region, such as a silicon or rubber material disposed between the respective portions or a scored or reduced-thickness portion of the imager PCB that allows the attaching portions 318c to flex relative to the imager portion.

In the illustrated example, the stress relieving portions 318d comprise slots 318d formed through the PCB between the imager 318a and the attaching portions 318c. That is, with the imager 318a disposed at a central region of the imager PCB 318, the lateral attaching portions 318c extend from opposing sides of the central region, with the stress relieving slots 318d formed at least partially through the imager PCB 318 between the imager 318a and the attaching portions 318c. The stress relieving slots 318d allow the imager PCB 318 to be attached (such as via fasteners 324) to the camera housing portion 322 and reduce or limit or eliminate stress and flexing on the PCB and reduce or limit or eliminate image plane deflection and focus shift. Thus, with the lens and imager 318a focused and aligned, the imager PCB 318 may be attached to the housing portion 322 and flexing of the attachment portions 318c is isolated from the central portion of the imager PCB 318 at which the imager 318a and lens barrel 320 are disposed.

Figures 16, 17, 18, 19, 20:
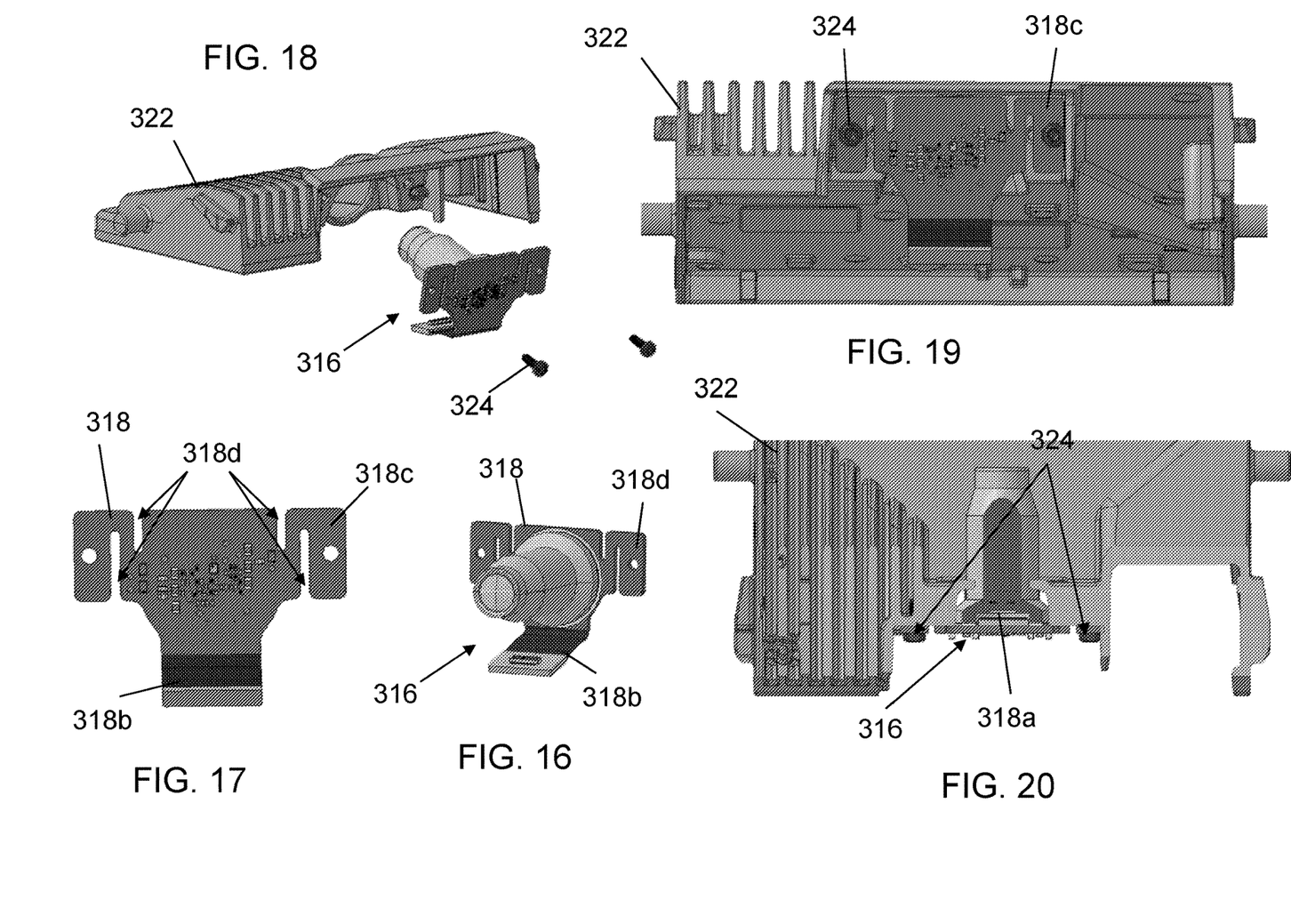
FIGS. 16 and 17 are views of an imager assembly having stress relieving slots at the printed circuit board.
FIGS. 18-20 are views of part of a camera module, showing how the imager assembly of FIGS. 16 and 17 is attached at the camera housing portion.

As shown in FIG. 17, the imager PCB 318 includes at least one stress relieving slot 318d between the imager portion and the attachment portions 318c. In the illustrated example, the imager PCB 318 includes first and second stress relieving slots 318d between a first lateral attachment portion 318c and third and fourth stress relieving slots 318d between a second lateral attachment portion 318c opposite the first lateral attachment portion 318c. The first and third stress relieving slots 318d extend from an upper edge of the imager PCB 318 and partially through the imager PCB toward an opposite lower edge of the imager PCB 318. The second and fourth stress relieving slots 318d extend from the lower edge and partially through the imager PCB toward the upper edge, and are laterally spaced from the respective first and third stress relieving slots 318d. The second and fourth stress relieving slots 318d are further outboard from the imager portion than the first and third stress relieving slots 318d. In other words, the stress relieving slots 318d extending from the lower edge of the imager PCB are disposed further outboard of the imager portion than the slots extending from the upper edge. Thus, the imager PCB 318, due to the stress relieving slots 318d, may form a substantially S-shaped pattern between each of the attachment portions 318c and the central imager portion.

Respective fastener receiving portions (e.g., fastener receiving through holes or slots) are formed through the respective attachment portions 318c and are configured to receive the respective fasteners 324 when the imager PCB is attached at the camera housing 322. With the imager PCB 316 attached to the camera housing 322, the stress relieving slots 318d isolate the imager portion from stresses felt at the attachment portions 318c and thus the attachment portions 318c may flex relative to the imager portion to accommodate stresses experienced when the fasteners 324 attach the attachment portions 318c to the camera housing 322 (such as stresses that may occur when the camera module is exposed to higher or lower temperatures due to different coefficients of thermal expansion for the housing and lens barrel and imager PCB).

In the illustrated embodiments, the imager assembly is part of a camera module, where the imager assembly may be disposed at a housing portion and the flexible connector may be electrically connected to another circuit board of the camera (such as a processor circuit board having an image processor and other circuitry disposed thereat), such as by utilizing aspects of the windshield-mounted camera assemblies described in U.S. Pat. Nos. 9,896,039; 9,871,971 and/or 9,596,387, which are all hereby incorporated herein by reference in their entireties. Optionally, the imager assembly may be part of an exterior-mounted camera, where a rear housing may be mated with the lens holder after the imager printed circuit board is attached to the lens holder, such as by utilizing aspects of the exterior camera assemblies described in U.S. Pat. Nos. 10,272,857 and/or 10,264,219, which are hereby incorporated herein by reference in their entireties. The camera assembly includes an electrical connector portion that is configured to electrically connect to a vehicle wire harness when the camera is installed at a vehicle.

Although shown as having a single printed circuit board (having the imager at one side and circuitry and connecting elements (such as a header connector) at the other side), the camera assembly may include an imager printed circuit board and a separate connector printed circuit board, with the circuitry of the two printed circuit boards electrically connected. The printed circuit boards may be attached at the lens holder or to the rear camera housing, and/or may be attached to one another, such as by utilizing aspects of the cameras and processes described in U.S. Publication No. US-2020-0010024, which is hereby incorporated herein by reference in its entirety. The imager is aligned with the lens at the lens holder and the lens is optically aligned and focused with the imager and the housing portions are joined or bonded, such as by utilizing aspects of the cameras and processes described in U.S. Pat. Nos. 10,272,857; 10,264,219; 9,451,138; 9,277,104 and/or 8,542,451, which are hereby incorporated herein by reference in their entireties.

The camera may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication No. US-2013-0242099; US-2014-0373345; US-2015-0222795; US-2015-0266430; US-2015-0365569; US-2016-0037028; US-2016-0268716; US-2017-0133811; US-2017-0295306 and/or US-2017-0302829, which are hereby incorporated herein by reference in their entireties. Optionally, the electrical connections may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The imager or imaging sensor of the camera may capture image data for image processing and may comprise, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties.

The imaging device and control and image processor may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2020-0039447; US-2015-0327398; US-2015-0015713; US-2014-0160284; US-2014-0226012 and/or US-2009-0295181, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera module, the vehicular camera module comprising:

a camera housing configured for mounting at an in-cabin side of a windshield of a vehicle equipped with the vehicular camera module, wherein the vehicular camera module, with the camera housing mounted at the in-cabin side of the windshield of the vehicle, views forward of the vehicle through the windshield;

a processor printed circuit board disposed in the camera housing;

an imager assembly, the imager assembly comprising (i) a lens barrel accommodating a lens, (ii) an imager printed circuit board and (iii) a flexible electrical ribbon cable;

wherein the imager printed circuit board is electrically connected to the processor printed circuit board via the flexible electrical ribbon cable;

wherein the camera housing has an upper housing portion and a lower housing portion, and wherein, with the camera housing mounted at the in-cabin side of the windshield of the vehicle, the upper housing portion is above the lower housing portion and attached thereto;

wherein the upper housing portion has an aperture that receives the lens barrel;

wherein the imager printed circuit board comprises a first side and a second side opposite the first side and separated from the first side by a thickness of the imager printed circuit board;

wherein the imager printed circuit board comprises (i) an imager portion and (ii) attaching portions at respective outboard ends of the imager printed circuit board;

wherein an imager is disposed at the first side of the imager portion of the imager printed circuit board;

wherein at least one stress relieving portion is established at the imager printed circuit board between the imager portion and each of the attaching portions, wherein the at least one stress relieving portion comprises at least one region of the imager printed circuit board that is more flexible than the imager portion and the attaching portions of the imager printed circuit board; and wherein, with the lens barrel received through the aperture of the upper housing portion of the camera housing, the attaching portions of the imager printed circuit board are attached at the upper housing portion of the camera housing via respective fasteners.

2. The vehicular camera module of claim 1, wherein the at least one stress relieving portion comprises (i) a first stress relieving portion between the imager portion and a first outboard end of the imager printed circuit board, and (ii) a second stress relieving portion between the imager portion and a second outboard end of the imager printed circuit board, the second outboard end being at an opposite side of the imaging portion from the first outboard end.

3. The vehicular camera module of claim 1, wherein the at least one stress relieving portion comprises at least one stress relieving slot established at least partially through the imager printed circuit board.

4. The vehicular camera module of claim 3, wherein the at least one stress relieving slot comprises (i) first and second stress relieving slots between the imager portion and a first outboard end of the imager printed circuit board, and (ii) third and fourth stress relieving slots between the imager portion and a second outboard end of the imager printed circuit board.

5. The vehicular camera module of claim 4, wherein the first and third stress relieving slots extend through the imager printed circuit board from a first edge of the imager printed circuit board and partially between the imager portion and the respective first and second outboard ends of the imager printed circuit board, and wherein the second and fourth stress relieving slots extend through the imager printed circuit board from a second edge of the imager printed circuit board, opposite the first edge, and partially between the imager portion and the respective first and second outboard ends of the imager printed circuit board.

6. The vehicular camera module of claim 4, wherein the second and fourth stress relieving slots are, respectively, disposed further outboard of the imager portion than the first and third stress relieving slots.

7. The vehicular camera module of claim 1, wherein a fastener receiving portion is established at the imager printed circuit board at each of the attaching portions, and wherein, with the attaching portions attached at the upper housing portion of the camera housing, the respective fastener receiving portions receive the respective fasteners.

8. The vehicular camera module of claim 1, wherein, with the attaching portions attached at the upper housing portion of the camera housing via the respective fasteners, the attaching portions are movable relative to the imager portion via flexing at the at least one stress relieving portion.

9. The vehicular camera module of claim 1, wherein the at least one stress relieving portion comprises a flexible material disposed between the imager portion and each of the attaching portions.

10. A vehicular camera module, the vehicular camera module comprising:
a camera housing configured for mounting at an in-cabin side of a windshield of a vehicle equipped with the vehicular camera module, wherein the vehicular camera module, with the camera housing mounted at the in-cabin side of the windshield of the vehicle, views forward of the vehicle through the windshield;
a processor printed circuit board disposed in the camera housing;
an imager assembly, the imager assembly comprising (i) a lens barrel accommodating a lens, (ii) an imager printed circuit board, (iii) an attaching flange attached at the lens barrel, and (iv) a flexible electrical ribbon cable;
wherein the imager printed circuit board is electrically connected to the processor printed circuit board via the flexible electrical ribbon cable;
wherein the camera housing has an upper housing portion and a lower housing portion, and wherein, with the camera housing mounted at the in-cabin side of the windshield of the vehicle, the upper housing portion is above the lower housing portion and attached thereto;
wherein the upper housing portion has an aperture that receives the lens barrel;
wherein the imager printed circuit board comprises a first side and a second side opposite the first side and separated from the first side by a thickness of the imager printed circuit board;
wherein an imager is disposed at the first side of the imager printed circuit board;
wherein a board end of the lens barrel is attached at the first side of the imager printed circuit board, and wherein the attaching flange is disposed along the lens barrel and spaced from the board end of the lens barrel and spaced from the imager printed circuit board; and
wherein, with the lens barrel received through the aperture of the upper housing portion of the camera housing, the attaching flange is attached at an inner side of the upper housing portion of the camera housing via at least one fastener.

11. The vehicular camera module of claim 10, wherein the imager assembly further comprises an anti-warping ring attached at the second side of the imager printed circuit board.

12. The vehicular camera module of claim 11, wherein the anti-warping ring circumscribes a region of the second side of the imager printed circuit board that is opposite from the imager disposed at the first side of the imager printed circuit board.

13. The vehicular camera module of claim 10, wherein the board end of the lens barrel circumscribes the imager at the first side of the imager printed circuit board.

14. The vehicular camera module of claim 10, wherein the board end of the lens barrel is attached at the first side of the imager printed circuit board via at least one of (i) an adhesive disposed between the board end of the lens barrel and the first side of the imager printed circuit board, and (ii) at least one fastener.

15. The vehicular camera module of claim 10, wherein a spacing ring is attached at the first side of the imager printed circuit board and at least partially circumscribes the imager at the first side of the imager printed circuit board.

16. The vehicular camera module of claim 15, wherein the spacing ring is disposed between the first side of the imager printed circuit board and the board end of the lens barrel.

17. The vehicular camera module of claim 15, wherein the spacing ring at least partially circumscribes the board end of the lens barrel.

18. A vehicular camera module, the vehicular camera module comprising:
a camera housing configured for mounting at an in-cabin side of a windshield of a vehicle equipped with the vehicular camera module, wherein the vehicular camera module, with the camera housing mounted at the in-cabin side of the windshield of the vehicle, views forward of the vehicle through the windshield;
a processor printed circuit board disposed in the camera housing;
an imager assembly, the imager assembly comprising (i) a lens barrel accommodating a lens, (ii) an imager printed circuit board and (iii) a flexible electrical ribbon cable;

wherein the imager printed circuit board is electrically connected to the processor printed circuit board via the flexible electrical ribbon cable;

wherein the camera housing has an upper housing portion and a lower housing portion, and wherein, with the camera housing mounted at the in-cabin side of the windshield of the vehicle, the upper housing portion is above the lower housing portion and attached thereto;

wherein the upper housing portion has an aperture that receives the lens barrel;

wherein the imager printed circuit board comprises a first side and a second side opposite the first side and separated from the first side by a thickness of the imager printed circuit board;

wherein the imager printed circuit board comprises (i) an imager portion and (ii) attaching portions at respective outboard ends of the imager printed circuit board;

wherein an imager is disposed at the first side of the imager portion of the imager printed circuit board;

wherein at least one stress relieving slot is established at least partially through the imager printed circuit board and at least partially between the imager portion and each of the attaching portions;

wherein the at least one stress relieving slot comprises (i) first and second stress relieving slots between the imager portion and a first outboard end of the imager printed circuit board, and (ii) third and fourth stress relieving slots between the imager portion and a second outboard end of the imager printed circuit board;

wherein the first and third stress relieving slots extend through the imager printed circuit board from a first edge of the imager printed circuit board and partially between the imager portion and the respective first and second outboard ends of the imager printed circuit board, and wherein the second and fourth stress relieving slots extend through the imager printed circuit board from a second edge of the imager printed circuit board, opposite the first edge, and partially between the imager portion and the respective first and second outboard ends of the imager printed circuit board; and wherein, with the lens barrel received through the aperture of the upper housing portion of the camera housing, the attaching portions of the imager printed circuit board are attached at the upper housing portion of the camera housing via respective fasteners.

19. The vehicular camera module of claim 18, wherein the second and fourth stress relieving slots are, respectively, disposed further outboard of the imager portion than the first and third stress relieving slots.

20. The vehicular camera module of claim 18, wherein a fastener receiving portion is established at the imager printed circuit board at each of the attaching portions, and wherein, with the attaching portions attached at the upper housing portion of the camera housing, the respective fastener receiving portions receive the respective fasteners.

21. The vehicular camera module of claim 18, wherein, with the attaching portions attached at the upper housing portion of the camera housing via the respective fasteners, the attaching portions are movable relative to the imager portion via flexing at the at least one stress relieving slot.

* * * * *